United States Patent Office 3,274,016
Patented Sept. 20, 1966

3,274,016
PROCESS FOR MANUFACTURE OF SOLID COMPOSITIONS COMPRISING ASPHALT AND CLAY CONTAINING SOILS
Dilworth T. Rogers, Summit, and John C. Munday, Cranford, N.J., assignors to Esso Research and Engineering Company, a corporation of Delaware
No Drawing. Filed June 24, 1963, Ser. No. 289,869
3 Claims. (Cl. 106—281)

The present invention is a continuation-in-part of Serial No. 256,666 filed February 6, 1963, entitled "Improved Asphalt Solid Compositions and Process of Manufacture," inventors: Dilworth T. Rogers and John C. Munday, now abandoned, which, in turn, is a continuation-in-part of Serial No. 178,038 filed March 7, 1962, entitled "Stabilized Asphalt Solid Compositions and Process of Manufacture," now abandoned, inventors: Dilworth T. Rogers and John C. Munday.

The present invention is concerned with solid compositions stabilized with petroleum residua and with a process of manufacture of these compositions and with shaped articles of manufacture comprising these compositions. The invention is particularly concerned with improved asphalt-stabilized soil and aggregate compositions having enhanced dry and wet compressive strength, superior tensile and flexural strengths, and relatively low water absorption properties. The present invention is particularly concerned with a method of utilizing soils containing a relatively high amount of expanding clays.

The stabilization of soil and other solids employing petroleum binders particularly for use in the construction field has not enjoyed appreciable commercial success. A very limited number of homes has been built, mainly in the western part of the United States, in which sandy clay-type soils in conjunction with asphalt have been used to form building blocks. In making these blocks, the asphalt was applied to the soil as a water emulsion of an asphalt cutback solution in a naphtha. The mixture was then hand-tamped generally in wooden molds, and the blocks sun-cured for several weeks. The asphalt functioned mainly as a waterproofing agent rather than as a binder, since the asphalt increased the wet strength of the soil but did not appreciably increase dry strength. In this process, it was considered essential to wet the soil with water before mixing it with the asphalt cutback, or to use an asphalt water emulsion. The water deflocculated the clay aggregate and served as a compaction lubricant.

It was found that building blocks produced by this prior art method and the composition thereof gave maximum unconfined wet compressive strengths at about 3 to 8 wt. percent asphalt, depending upon the type of soil used, but failed to approach the compressive and tensile strength of commercially available concrete blocks and brick. Despite their low unit strength, these materials were of some limited use in arid or semi-arid regions in the form of thick, solid blocks where economic factors favored their use in certain types of construction. These blocks were wholly unsuitable in other geographical regions where there was a significant variation in humidity or where these building materials would contact moisture. Thus, beside very low compressive and tensile strength necessitating the use of thick solid blocks for adequate strength, the prior art asphalt-stabilized soil compositions could not be used in home construction, even in solid block form, where there was water contact or a variation in the humidity of the air, without a subsequent exterior coating. Thus, these prior art materials could not be employed, for example, below grade or at footing levels. A further disadvantage of these prior art materials was the poor adhesion characteristics of exterior finishes such as paint, mortar, stucco and the like to the exterior surface of the blocks. The blocks apparently expanded and contracted in response to small changes in the humidity of the air, resulting in extensive cracking and peeling of exterior coatings.

Many of the disadvantages of the prior art can be avoided, and compositions of enhanced dry and wet compressive strength can be obtained if a critical quantity of a petroleum residua such as asphalt is used in conjunction with soil of certain particle-size distribution, and if the soil-asphalt mixture is compressed within a critical range of its theoretical 100% density. The compressed solid is then heat-treated under specific conditions to produce a high quality product suitable as a building material such as blocks, bricks, tile, board, pipe and the like. In general, the amount of asphalt employed with various soils varies from about 6% or more, preferably about 8% to about 30 wt. percent, based on the soil, although within this broad range the optimum range for a particular soil may be quite narrow, such as 11% to 13%. After mixing the soil and asphalt, the mixture is then compressed to a density of about 70 to 98% based upon the theoretical density. The compressed product is then cured at a temperature in the range from about 300 to 500° F. for a time period of from about 4 to 80 hours.

A wide variety of soils can be used with the asphalt binder to form high strength structures by this process. In general, the preferred solids contain minerals which have well defined crystal shapes and in particular those crystal shapes which are readily compacted to low voids-content structures, and in addition do not contain appreciable quantities of the so-called expanding clays. For example, kaolinite, chlorite, talc, mica, specular hematite which crystallize as plates or discs are readily compacted with asphalt to produce high strength structures. Asbestos, which has a fibrous structure and attapulgite which crystallize as needles are less readily compacted.

As is well-known, finely divided solids are more readily compacted to give nonporous structures than coarse solids. Clays and clay solids are examples of finely divided solids occurring in nature which can be used to prepare high strength structures. All types of clay soils can be used, ranging from practically 100% clay content to those with low clay content if the structure will not be exposed to water. For use in the presence of water the soil should not contain appreciable amounts of organic matter or water-soluble salts. Also, if the structure is to be exposed to water it is essential that the amount of the so-called expanding clays be kept at low levels, and generally below 10%, preferably below 5%. Although structures formed from these clays with asphalt have high dry strength they disintegrate in the presence of water.

The present invention is particularly concerned and directed toward a technique for the utilization of soils containing a relatively high percentage of expanding type clays such as montmorillonite as, for example, those soils containing in excess of 2% of expanding clays, particularly soils containing in excess of 5% of expanding clays. In accordance with the present invention, the soils prior to compaction and preferably prior to mixing with the bituminous binder are rendered acceptable by treatment with a salt of a nitrogenous base such as an amine or quaternary ammonium salt.

Building blocks which are made from asphalt and expanding clays such as the montmorillonite (bentonites), vermiculite, "open-end" illite, halloysite, sepiolite, attapulgite, and the like which expand in the presence of water or other polar materials rapidly disintegrate in the presence of water. It has now been found that if soils containing the expanding clays are treated with long chain amine or quaternary ammonium salts prior to mixing with asphalt and subsequent compaction and curing the resistance to water is markedly improved.

Although the amine or quaternary ammonium salts may be simply mixed with the asphalt prior to adding to the soil a greater degree of improvement in water resistance can be obtained by pretreating the clay soil. The method consists in adding the amine or quaternary ammonium salt, as a saturated solution in water, to a stirred suspension of the clay in water. The quantity of amine or quaternary ammonium salt employed depends on the amount of expanding clay present and its cation-exchange capacity, as well as on the amount of nonexpanding clay associated with the expanding clay and its cation-exchange capacity. Typical capacities for the expanding clays are from 80 to 150 milli-equivalents per 100 grams, and for the nonexpanding clays from 3 to 40 milli-equivalents per 100 grams. In general it is necessary to use an amount, slightly in excess of the total cation-exchange capacity of the total soil. Thus, if a soil contains a small amount of expanding clay and a relatively larger amount of nonexpanding clay, treating with an amount of amine or quaternary ammonium salt to replace just the exchangeable cations in the expanding clay would not necessarily produce the desired result since in some instances the cation-exchange reactions of the nonexpanding clays take place more rapidly than the corresponding reactions for the expanding clays. The result might thus be that a major proportion of the expanding clay might remain unreacted and, consequently, still remain water sensitive. A permissible lower limit of unexchanged cations is 5 milli-equivalents per 100 grams of soil. The ratio of soil to water in the suspension depends on the particular soil involved. With Wyoming bentonite, which forms very viscous suspensions, a greater amount of water is required than for vermiculite. The amount of water should be sufficient so that the suspension can be readily stirred. As the amine salt solution is added the clay suspension becomes less viscous and when the addition is complete most of the clay floats on top of the water. In most cases the exchange reaction can be driven more nearly to completion by heating the aqueous suspension for about an hour at temperatures in the order of 150–200° F. The treated clay soil is then filtered, washed with a small quantity of water, dried at temperatures of 220–240° F. and lightly crushed.

In general the amine or quaternary ammonium salt should have at least one alkyl (straight chain) group containing 12 or more carbon atoms in the chain. Products prepared from naturally occurring oils and fats (animal or vegetable—palm, linseed, soya) are suitable.

The amine salts and quaternary ammonium salts may also be derived from the asphalt which is to be used as the binder for the solid. The methods consist in (1) treating the asphalt with chlorine or other halogens adding an alkyl amine (which may be a primary, secondary or tertiary amine and have from 5 to 20 carbon atoms) and heating to temperatures above 250° F., or (2) by introducing amine groups into the asphalt and heating with an alkyl halide. In either case, the reaction product may be used as the soil binder or it may be diluted with untreated asphalt.

In general the techniques used in making asphalt-soil building materials and previously described in patent applications by the same inventors may be employed in the present invention.

In order to waterproof clay soils with asphalt it is necessary to cover the particles with a thin layer of asphalt. Since the surface area of finely divided solids is high it is not unexpected that larger amounts of asphalt would be needed to provide a protective layer on high clay-content soils. For economic reasons therefore it is desirable to use relatively low clay-content soils in asphalt-soil block manufacture. A very satisfactory soil is one which contains about 20–25% clay, the remainder being silt and sand. With this soil 8–12% asphalt by weight on the soil will provide high strength and adequate water repellancy. It will be obvious that sandy, silty, and clayey soils can be blended to achieve the desired particle size distribution, suitable distributions having been disclosed in U.S. Serial No. 256,666, now abandoned, and Colombian Patent 11,977 granted June 19, 1963, which corresponds to the aforesaid U.S. Serial No. 256,666.

With some soils and minerals it is possible to obtain high strength with less clay or finely-divided particles (below $5\mu$) present. In these, as mentioned previously, the coarse particles are present as crystals of nearly equi-dimensional size (plates, discs, prisms, etc.) which are easily compacted to low void content structures. When the coarser particles are not of this type, as found in sand and some silts, the strength of the asphalt soil blocks will be somewhat lower but may be adequate for applications where high loads will not be applied such as in one-story dwellings.

The particle size of soils is ordinarily determined by ASTM Method D422–54T. In this procedure particle size is calculated from the rate of settling in a water suspension. Although clay soils form agglomerates and aggregates of the primary soil particles they are largely broken up by water. It is thus possible to have a soil which appears to be very coarse on the basis of a dry screen analysis but which shows a high clay content in the ASTM D422–54T grain size analysis. On mixing soil with asphalt these agglomerates or aggregates are partially permeated by asphalt, and to some extent they are disintegrated into finer particles which are coated by asphalt. Coverage is not complete, however, and one obtains a nonuniform structure which may have low strength and high water sensitivity. It is essential therefore that the larger agglomerates be broken up by light grinding or other means approaching as a limit the same state of subdivision as indicated by ASTM D422–54T before mixing with the asphalt.

The binder employed in the present invention comprises that family of materials commonly referred to as asphalts, such as natural or petroleum residua of thermoplastic solid or semi-solid consistency at ambient temperatures, normally of brown to black cementitious material in which the predominating constituents are bitumens. The bituminous material to be used may be selected from a wide variety of natural and industrial products. For instance, various natural asphalts may be used such as natural Trinidad, gilsonite, Grahamite and Cuban asphalts. Petroleum asphalts suitable for the purposes of this invention include those asphalts obtained from California crude, from tar sands, Venezuelan or Mexican petroleum asphalt, or Middle East or a Mid-Continent airblown oil and the like, or combinations thereof. Petroleum asphalts also include those asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products from the chemical refining such as oxidation of high molecular weight hydrocarbons, those asphalts obtained from hydrogenated coal products, the asphaltic material obtained in the thermal or catalytic cracking of petroleum to obtain gasoline or other light fractions or any combination of these materials.

Petroleum asphalts are generally prepared from petroleum residual oils obtained by the distillation of an asphaltic or semi-asphaltic crude oil or thermal tar or by the fluxing of harder residual asphalts with heavy petroleum distillates. Such residual oils are high boiling liquids or semi-solids which may have softening points from about 32° F. to about 120° F. and are generally characterized by specific gravities ragning from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending or solvent deasphalting of residual oils. These operations remove a significant quantity of the lower boiling, more volatile material present in the residual oils and result in a product having a softening point between about 100° and about 170° F., although higher softening points can be obtained by more extensive treatment. Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. Both straight reduced asphalts and oxidized asphalts are useful in the invention.

Although the petroleum asphalts are preferred, other suitable bituminous material would include coal tar, wood tar, and pitches from various industrial processes. The invention can also be successfully practiced with chemically modified asphalts such as halogenated, e.g., chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed with minor amounts, e.g. 1 to 10 wt. percent, of other natural and synthetic thermoplastics and thermosetting materials like rubbers, resins, polymers and elastomers, of an oily, resinous or rubbery nature. Non-limiting examples of suitable materials include polyolefins, polypropylene, polyethylene, polyisobutylene, polymers from steam-cracked naphthas and the like; natural or synthetic rubber-like butyl rubber, halogenated butyl rubber, polydienes like polybutadiene, elastomeric copolymers of styrene and butadiene, copolymers of ethylene and propylene and the like; epoxy resins; polyalkylene oxides; natural and synthetic waxes; polyvinyl acetates; phenol aldehyde condensation products; and the like and combinations thereof.

Furthermore, in a modification wherein the asphalt is chemically modified by reaction with liquid reagents, for example, $CCl_4$, the reagent liquid can often be used as the asphalt solvent, whereupon the desired reaction occurs before, during or after the compaction of the soil-asphalt cutback mixture, or during or after the curing step, or the reaction may occur continuously during both finishing process steps.

Satisfactory asphalts, for example, are those designated in the trade as fluxes, binders, and various oxidized asphalts. Data on some typical suitable asphalts are shown below:

| Asphalt | Softening Point, °F. | Penetration at 77° F. |
|---|---|---|
| Flux A | <75 | >300 |
| Binder C | 113 | 85-100 |
| Oxidized Asphalt 1 | 180-200 | 24 |
| Oxidized Asphalt 2 | 200-235 | 18 |

The asphalt can be incorporated with the subdivided solid material as a solvent cutback, using a volatile organic cutback solvent such as petroleum naphtha or other solvent boiling in the range of about 175° F. to 600° F., e.g., 200° F. to 400° F. The cutback solvent should preferably be one that is sufficiently volatile to be substantially volatilized during the selected curing step, i.e., a solvent having a boiling point of less than 600° F. or advantageously less than 400° F. Suitable asphalt concentrations in the cutback solution are from 30 to 90 wt. percent asphalt, e.g. 50 to 75%. Preferably, the Furol viscosity at the temperature at which the cutback is applied should be 100 or less, e.g. 20 to 100 Furol. Suitable cutback solvents thus include, but are not limited to, hydrocarbons such as toluene, benzene, xylene, Varsol, VM & P naphtha, halohydrocarbons such as carbon tetrachloride and methylene dichloride, or any combinations thereof. Whatever the solvent, it should be substantially removed from the asphalt-solid mixture prior to compaction, as disclosed in the parent application, Serial No. 178,038.

The asphalt can also be incorporated with the subdivided solid while in the molten state and this is generally the preferred method. The temperature of the asphalt at the time of mixing should be such that the viscosity is sufficiently low that good mixing is achieved and the solid particles are uniformly coated. Suitable asphalt viscosities are in the range of about 20 to 100 Furol, corresponding to mixing temperatures from about 275° F. in the case of soft asphalts such as fluxes, to 350°–450° F. in the case of harder asphalts such as binders and oxidized asphalts. In carrying out the hot-mixing operation, the solid is generally pre-heated and charged to the mixer, and the molten asphalt is then pumped in. It is usually sufficient to introduce the asphalt as a low pressure spray, although atomized or foamed asphalt can be used. Various commercial mixers are suitable, such as the type of paddle mill known as a pug mill. Where an efficient mixer is employed, the time of mixing can be relatively short, such as one or two minutes. In some cases, however, it may be desirable to extend the mixing time to say 15–30 minutes or longer in order to harden the asphalt after incorporation with the solid. For example, it has been found that when starting with flux or binder asphalts, stronger structural products are obtained if the asphalt is hardened in this fashion by heating in air, say at 400° F., after mixing with the solid, but before compacting the mixture. Conversely, when starting with a hard asphalt such as an air-blown asphalt, it may be desirable to blanket the mixer with inert gas so as to decrease the rate of hardening.

Generally, it is preferable to mix the asphalt cutback or the molten asphalt with solid that is relatively dry, having not more than 1–2% moisture. When solid containing considerable water is employed, it is preferable to dry the solid-asphalt mixture to a fairly low water content prior to compaction. If this precaution is observed, emulsified asphalt cutbacks can be employed in the process of the invention.

The development of high strength materials from finely divided solids and residua (asphalts) depends to a marked extent on high temperature curing, e.g., 300°–500° F. The time of curing depends on the temperature level, the higher the temperature the shorter the time needed. In general, the curing conditions to produce blocks which retain their strength in the presence of water and which do not absorb water are less severe than those required to produce high dry strength.

The principal mechanism involved in the formation of high strength materials from solids and asphalt appears to be oxidation of the asphalt although the evolution of volatile material is also involved to some extent. The volatile material may be present in the original asphalt or subsequently produced by cracking and oxidation.

That oxidation is the chief mechanism is shown by comparing the results of curing in air versus nitrogen. In the latter case, with clay soil and asphalt, the compressive strength was less than one-half of those cured in air.

To develop high strength during curing, the compacted solid-asphalt structure should have sufficient porosity to permit the diffusion of oxygen into the interior of the structure and to permit the egress of volatile materials without disrupting the binder (asphalt) films. The solid particles however must be sufficiently close together so that the greater part of the binder is present as a very thin, nearly-continuous phase if high strength is to be developed on curing. Thus if there is insufficient binder to cover most of the solid particles with very thin films and if compaction is not carried to the point where the solids are brought in close proximity, low strength, especially in the presence of water, will result. On the other hand, if an excess of asphalt is present, thick films will be formed and low strength will result on curing, regardless of the degree of compaction. At low densities the strength of the structure would not be expected to be much greater than that of asphalt by itself. At high densities diffusion of oxygen into the interior of the structure and even into the interior of the thick binder films is retarded and more significantly the evolution of volatile materials is impeded. The latter effect results in severe cracking during curing and produces both deformation and low strength.

In order to designate a suitable range of density (degree of compaction) for the development of high strength, an expression "Percent of Theoretical Density" has been formulated which is defined as follows:

Percent of theoretical density=percent of the density the solid+binder would have if there were no voids in the compacted structure.

A sample calculation would be: A compacted mixture of clay soil ($d=2.61$ g./cc.) with 10 wt. percent asphalt based on the soil ($d=1.04$ g./cc.) is found to have a density of 2.08 g./cc. The theoretical density (no voids) of this mixture would be $$\frac{100}{2.61}+\frac{10}{1.04}=\frac{110}{x}$$

$$x=2.29$$

Percent of theor. den. $=\frac{3.08}{2.29}\times 100=90.8\%$

To achieve the advantages of the invention, the asphalt-solid mixture should be compacted to a density in the range from about 70–98% of the theoretical density, a more preferred range being from about 75–95%. The optimum percent theoretical density varies with a number of factors, such as asphalt concentration, compaction temperature, presence of solvent at the time of compaction, curing conditions, and the size and shape of the article being molded. For example, with sandy clay soils containing about 20–25% clay ($<5\mu$ particle size) and 10–12 wt. percent asphalt, the optimum density is usually in the range from about 88–94% theoretical density, while with 9% asphalt the optimum may be higher, such as about 96%. Also, whereas the optimum may be about 92% in the case of 1.28″ diameter x 3″ high briquettes, it may be about 88% in the case of 8″ x 4″ x 2.5″ bricks.

When the soils contain appreciable quantities of the expanding clays the optimum theoretical density is generally lower than for those which do not contain them. Also, when the soil-asphalt mixture is compacted with a small amount of an asphalt solvent, such as 1–2% of naphtha, toluene, xylene, etc., the optimum density is generally lower than when the mixture is compacted without solvent. Suitable compaction temperatures are from 50° to 350° F., preferably from 60° to 200° F., while the compaction pressure required to achieve the desired density may range from about 500 p.s.i. to 5,000 p.s.i.

The invention will be more clearly understood from the following examples:

EXAMPLE 1

A sample of Wyoming-type bentonite (>90% of particles $5\mu$ or less and a cation exchange capacity of about 90 milliequivalents per 100 grams) which is not suitable for the preparation of asphalt-soil blocks was treated with four different amine salts according to the method previously described in this specification.

The amine salts were Armac 18D, a $C_{18}$ fatty amine acetate, and the Arquads T-2C, 2HT and 12. The Arquads are quaternary ammonium chlorides. T-2C is a mixture of monoalkyl and dialkyl ammonium chlorides in which the alkyl groups contain 12 and more carbons. 2HT is a dialkyl ammonium chloride in which the alkyl groups have mainly 18 carbon atoms in the chain. Arquad 12 is a monoalkylammonium chloride in which the alkyl groups generally have 12 carbon atoms per chain (90% $C_{12}$). The ratio of amine or ammonium salt to clay in each case was 100 milliequivalents of salt for each 100 grams of clay.

EXAMPLE 2

The untreated bentonite as well as the four treated samples of Example 1 were formed into briquettes (3″ long x 1.28″ dia.) by mixing with asphalt and compacting at 2340 p.s.i. pressure for 5 minutes at 75° F. The briquettes were cured at 350° F. for 16 hours.

The asphalt used was an oxidized asphalt having a softening point of 213° F. It was applied to the bentonite as a 50/50 by weight cutback in toluene with agitation at 75° F. Most of the toluene was allowed to evaporate while being agitated. A small amount of toluene was allowed to remain (1.5 wt. percent on soil for each 12 wt. percent of asphalt) in order to facilitate compaction.

The unconfined axial compressive strength was determined on the cured briquettes and after soaking in water for 7 days, using a loading rate of 2″/minute. As will be seen by the results in Table I, the treatment of the bentonite with amine or ammonium salts markedly increased wet strength and when the alkyl side chain contained more than 12 carbon atoms the dry strength was also improved. The quantity of asphalt required to completely cover the clay particles is also less when the longer alkyl groups are present in the clay treating agents.

*Table I*

TREATMENT OF BENTONITE CLAY SOIL—WYOMING TYPE BENTONITE + 213° S.P. OXIDIZED ASPHALT

| Clay Pretreating Agent | Wt. Percent Asphalt (On Soil) | Wt. Percent Toluene (On Soil) | Compressive Strength, p.s.i. | |
| --- | --- | --- | --- | --- |
| | | | Dry | Wet |
| None | 18 | 2.25 | 1,430 | 0 |
| None | 24 | 3.0 | 1,760 | 0 |
| Armac 18D | *18 | 2.25 | 1,845 | 1,160 |
| Arquad T-2C | *24 | 3.0 | 1,500 | 1,100 |
| Arquad 2HT | *30 | 3.75 | 1,940 | 1,290 |
| Arquad 12 | *30 | 1.5 | 945 | 730 |

*Quantity of asphalt needed to give complete coverage of the clay.

What is claimed is:

1. A process for the manufacture of a hard bituminous solid composition which comprises the steps of:
   (a) mixing a clay with an excess of water to form a slurry, said clay being one which expands in the presence of water or other polar material,
   (b) adding a salt of a nitrogenous base until said clay separates from the water and floats,
   (c) removing the clay from the water and drying it at a temperature of from 220° to 240° F.,
   (d) mixing the treated clay with from 8 to 20 wt. percent of a bituminous binder,
   (e) compressing the mixture to 80 to 98% of its theoretical density, and
   (f) curing the compressed mixture at a temperature of from 300° to 500° F. for from 4 to 80 hours.

2. A process as in claim 1 wherein said clay is mixed with a solid aggregate prior to mixing with a bituminous binder.

3. A process for the manufacture of a hard bituminous solid composition which comprises the steps of:
(a) mixing bentonite with water,
(b) adding dialkyl ammonium chloride until said bentonite separates from the water and floats, the alkyl groups of said chloride having about 18 carbon atoms,
(c) separating and drying the treated bentonite at about 220° to 240° F.,
(d) mixing said bentonite with asphalt,
(e) compacting the bentonite-asphalt mixture to 85 to 95% of its theoretical density, and
(f) curing the compacted mixture at a temperature of 400° F. for about 16 hours.

References Cited by the Examiner

UNITED STATES PATENTS

| | | | |
|---|---|---|---|
| 1,007,833 | 11/1911 | Wilkinson | 106—280 XR |
| 2,314,181 | 3/1943 | Winterkorn | 260—28.5 |
| 2,389,680 | 11/1945 | Mikeska. | |
| 2,427,488 | 9/1947 | Anderson et al. | 106—269 |
| 2,438,318 | 3/1948 | Johnson. | |
| 2,531,440 | 11/1950 | Jordan | 252—28 |
| 2,582,824 | 1/1952 | Fowkes. | |
| 2,661,301 | 12/1953 | Capell | 106—281 |
| 2,813,035 | 11/1957 | Sauter | 106—38.35 |
| 2,971,922 | 2/1961 | Clem | 252—316 |
| 3,010,840 | 11/1961 | Goff et al. | 117—21 |
| 3,023,113 | 2/1962 | Barlow | 106—38.8 |
| 3,027,265 | 3/1962 | Miericke | 106—38.2 |

OTHER REFERENCES

Lea and Desch, The Chemistry of Cement and Concrete, Edward Arnold (Publishers) Ltd., London (page 502, "Expanded Perlite," relied upon).

ALEXANDER H. BRODMERKEL, *Primary Examiner.*

MORRIS LIEBMAN, *Examiner.*

J. B. EVANS, *Assistant Examiner.*